United States Patent
Kamiyama et al.

[11] Patent Number: 6,042,668
[45] Date of Patent: Mar. 28, 2000

[54] PIPE LINER BAG AND MANUFACTURING METHODS THEREFOR

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-jushi Seisakusho K.K., Kanagawa-ken; Yokoshima & Company; GET Inc., both of Ibaraki-ken; OAR Company, Saitama-ken, all of Japan

[21] Appl. No.: 09/028,762

[22] Filed: Feb. 24, 1998

[30] Foreign Application Priority Data

Feb. 28, 1997 [JP] Japan ................... 9-045201

[51] Int. Cl.[7] .............. B32B 5/02; B32B 31/12
[52] U.S. Cl. .............. 156/93; 156/94; 156/148; 156/294; 156/304.4; 138/98
[58] Field of Search .............. 156/93, 94, 148, 156/287, 294, 304.3, 304.4, 304.7; 138/97, 98; 264/36.17; 405/150.1; 428/36.1, 36.5, 36.6

[56] References Cited

U.S. PATENT DOCUMENTS

| | | | |
|---|---|---|---|
| 3,819,465 | 6/1974 | Parsons et al. | 156/148 |
| 4,009,063 | 2/1977 | Wood | 156/294 |
| 4,446,181 | 5/1984 | Wood | 156/294 |
| 4,600,615 | 7/1986 | Hyodo et al. | 138/97 |
| 5,698,056 | 12/1997 | Kamiyama et al. | 138/98 |

*Primary Examiner*—Michael W. Ball
*Assistant Examiner*—Michael A Tolin
*Attorney, Agent, or Firm*—Whitham, Curtis & Whitham

[57] ABSTRACT

A pipe liner bag is provided with improved anti-peeling and anti-bursting properties by ensuring a high anti-peeling strength of the plastic film to be employed. The pipe liner bag has a tubular resin absorbent material, the outer surface of which is coated with a highly air-tight plastic film, and a hardenable resin impregnated in the tubular resin absorbent material. The tubular resin absorbent material is formed of tubular unwoven fabric subjected to the needle punching processing, where a side of the tubular unwoven fabric having stuck-out needles protruding therefrom is exposed to the outside to serve as an outer surface of the tubular resin absorbent material. The outer surface is coated with a plastic film.

23 Claims, 8 Drawing Sheets

PIPE LINER BAG AND MANUFACTURING METHODS THEREFOR

BACKGROUND OF THE INVENTION

1. Field of the Invention

The present invention relates to a pipe liner bag which is mainly used for repairing pipelines, and manufacturing methods therefor.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

Meantime, tubular resin absorbent materials generally and widely used for the pipe liner bag in the pipe lining method mentioned above include unwoven fabrics such as polyester, acrylic resin, polypropylene, or the like (for example, refer to Japanese Provisional Patent Publication (Kokai) No.4-59227). The processing methods of the unwoven fabric are roughly classified into two: a needle punching method and a spun bond processing method.

Conventionally, any unwoven fabric may be used as it is so long as the unwoven fabric, after being subjected to the processing, has the characteristics suitable for the pipe liner bag, irrespective of the method it is processed.

Meantime, of the pipe liner bag of the type which is everted and inserted into the pipeline by fluid pressure, the outer surface (this comes out to be the inner surface after being everted) of the tubularly processed unwoven fabric needs to be coated by a highly air-tight plastic film, and the plastic film has two types: one that remains as it is on the inner peripheral surface of the unwoven fabric, after the lining process, to constitute the inner surface of the pipe liner bag, and the other that is peeled from the inner surface of the unwoven fabric after the lining process.

Of the pipe liner bag of the type where the plastic film coated on the inner circumferential surface of the unwoven fabric remains as it is after the lining process, the plastic film must have a high anti-peeling strength. The reasons for the requirement of high anti-peeling strength are as follows. First, the plastic film needs to have high anti-peeling property since the plastic film is, after the lining process, subjected to the friction of the fluid that flows in the pipeline and to the injection pressure of the high pressure water used for cleaning the pipeline. Second, the plastic film needs to have high anti-bursting properties since the plastic film is subjected to the fluid pressure during the lining operation.

Further, with regard to the anti-bursting property, when the plastic film is evenly and firmly adhered or, on the contrary, not adhered at all to the unwoven fabric, the plastic film has high anti-bursting property, and when the anti-peeling strength is weak due to the plastic film being unevenly adhered to the unwoven fabric, the plastic film unevenly extends, thus causing a deteriorated anti-bursting property.

In such a circumstance, as means to increase the anti-peeling strength of the plastic film against the unwoven fabric, such methods are conceivable that the plastic film is made thicker to give more welding deposits to the unwoven fabric so that the adhering property of the plastic film against the unwoven fabric may be increased and that the thermo-adhesive film having stronger property to adhere to the thread of the unwoven fabric is used as the plastic film.

However, even if the adhering quality of the plastic film against the unwoven fabric is increased, it is impossible for the unthreadable unwoven fabric to ensure high anti-peeling strength on the plastic film.

OBJECTS AND SUMMARY OF THE INVENTION

The present invention has been made in view of the problems described above, and it is an object of the present invention to increase an anti-peeling strength of a plastic film against unwoven fabric, thus providing a pipe liner bag having improved anti-peeling and anti-bursting properties and manufacturing methods for the pipe liner bag.

To achieve the above object, according to a first aspect of the present invention, there is provided a pipe liner bag comprising a tubular resin absorbent material, the outer surface thereof being coated with a highly air-tight plastic film and a hardenable resin being impregnated in the tubular resin absorbent material, wherein the tubular resin absorbent material is formed of tubular unwoven fabric subjected to the needle punching processing, with a side of the tubular unwoven fabric having stuck-out needles protruding therefrom being exposed to the outside to serve as an outer surface of the tubular resin absorbent material, the outer surface coated with a plastic film.

According to a second aspect, the present invention provides a method of manufacturing a pipe liner bag comprising the steps of:

performing needle punching processing on a unwoven fabric strip;

folding the unwoven fabric strip in twofold such that a side having the stuck-out needles is exposed to the outside to serve as an outer surface;

aligning both edges and stitching the edges together to obtain a tubular unwoven fabric gradually expanding the tubular unwoven fabric in a pipe shape, portion by portion in lengthwise direction, with the edges in the stitching area being abutted against each other, folding the tabular unwoven fabric such that the abutted area is located substantially in the center of the width direction of the tubular unwoven fabric, adhering or welding the outer surface of the abutted area to or with a reinforcing material, the reinforcing material being formed of an unwoven fabric strip having the outer surface subjected to the needle punching processing to have stuck-out needles protruding therefrom;

coating the outer surface of the tubular unwoven fabric with a highly air-tight plastic film; and impregnating the tubular unwoven fabric with a hardenable resin.

According to a third aspect of the present invention, there is provided a method of manufacturing a pipe liner bag comprising the steps of:

performing needle punching processing on a surface of an unwoven fabric strip to have stuck-out needles protruding therefrom;

coating the surface of the unwoven fabric strip with a highly air-tight plastic film;

folding the unwoven fabric strip in twofold such that the side coated with the plastic film is exposed to the outside to serve as an outer surface;

aligning both edges of the unwoven fabric and stitching the edges together to obtain a tubular unwoven fabric gradually expanding the tubular unwoven fabric in a pipe shape, portion by portion in lengthwise direction, with the edges in the stitching area being abutted against each other;

folding the tubular unwoven fabric such that the abutted area is located substantially in the center of the width direction thereof;

adhering the abutted area to or welding the abutted area with a sealing tape on the outer surface thereof; and impregnating the tubular unwoven fabric with a hardenable resin.

It has been found that in the non-woven fabric obtained by being subjected to the needle punching processing, the threads on the side having stuck-out needles are by far less unthreadable than those on the side having stuck-in needles.

Thus, according to the present invention, since the tubular unwoven fabric is arranged to have the side with stuck-out needles (i.e., the side on which threads are less unthreadable) as the outer surface thereof to be coated with the plastic film, the anti-peeling strength of the plastic film against the unwoven fabric is enhanced, thereby making it possible to provide a pipe liner bag with the plastic film having improved anti-peeling and anti-bursting properties.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereunder be described in conjunction with preferred embodiments thereof with reference to the accompanying drawings.

Figure 1:
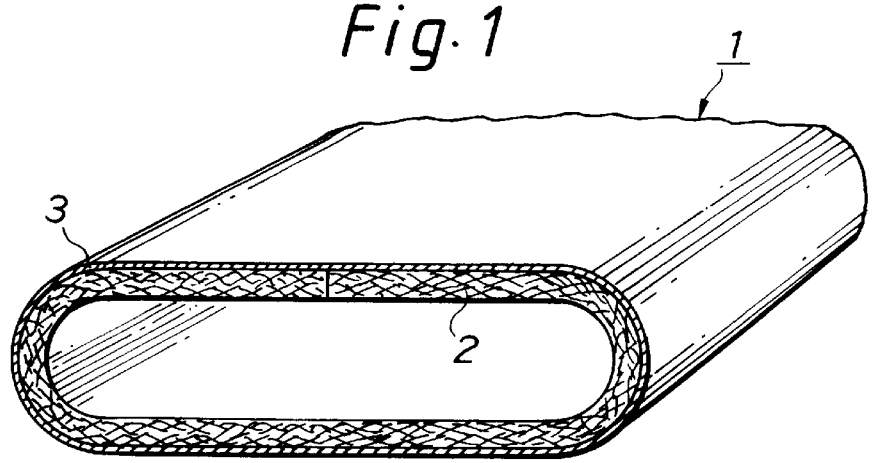
FIG. 1 shows a partial perspective view of a tubular liner bag according to the present invention.

FIG. 1 shows a partial perspective view of a pipe liner bag 1 according to the present invention, wherein the pipe liner bag 1 comprises a tubular resin absorbent material 2, which has the outer surface thereof coated with a highly air-tight plastic film 3, and thermosetting resin such as unsaturated polyester resin, epoxy resin, and the like is impregnated into the tubular resin absorbent material 2.

The tubular resin absorbent material 2 comprises tubular unwoven fabric subjected to the needle punching processing, and materials selected for the tubular unwoven fabric 2 are polyester, acrylic, polypropylene, glass, carbon, ceramic and the like. The tubular unwoven fabric 2 has as outer surface thereof the side subjected to the needle punching processing, which will be described later, and having stuck-out needles, and the outer surface thereof is coated with the plastic film 3. Here, as a material for the plastic film 3, polyurethane, polyethylene, nylon, vinyl chloride, or the like, may be selected. The needle punching processing may be performed on a multiplicity of laminated unwoven fabric layers which have been spun bond processed. Alternatively, the needle punching processing may be performed on a multiplicity of laminated spun-bonded unwoven fabric layers and needle-punched unwoven fabric layers as a final needle punching step. Such unwoven fabric finally has the side with stuck-out needles as the outer surface, which is coated with the plastic film.

By the way, experiments made by the inventors of the present invention have confirmed that, with regard to the unwoven fabric subjected to the needle punching processing, the thread on the side of the tubular unwoven fabric having stuck-out needles is by far less unthreadable than the thread on the side having stuck-in needles.

Consequently, in the pipe liner bag 1 according to the present invention, since the tubular unwoven fabric 2 is arranged to have the side thereof with stuck-out needles by the needle punching processing, namely less unthreadable side, as the outer surface thereof, and to have the outer surface coated with the plastic film 3, the anti-peeling strength of the plastic film 3 against the tubular unwoven fabric 2 is reinforced to enable the plastic film 3 to evenly and firmly adhere to the outer surface of the tubular unwoven fabric 2.

Here, the pipe lining operations to be performed making use of the pipe liner bag 1 formed as above-mentioned will be described below with reference to FIGS. 2 and 3. By the way, FIGS. 2 and 3 are the cross-sectional views showing the pipe lining operations in a sequence.

Figure 2:
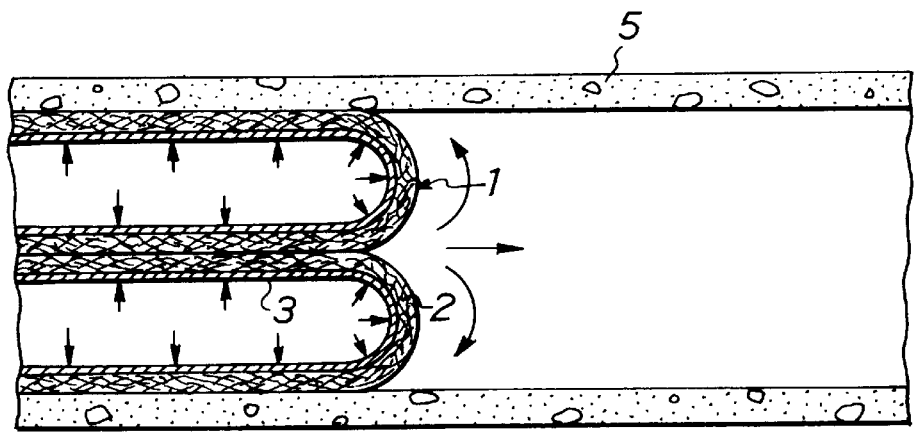
FIG. 2 shows a cross-sectional view of a pipe lining method which is implemented by use of the pipe liner bag according to the present invention.
Figure 3:
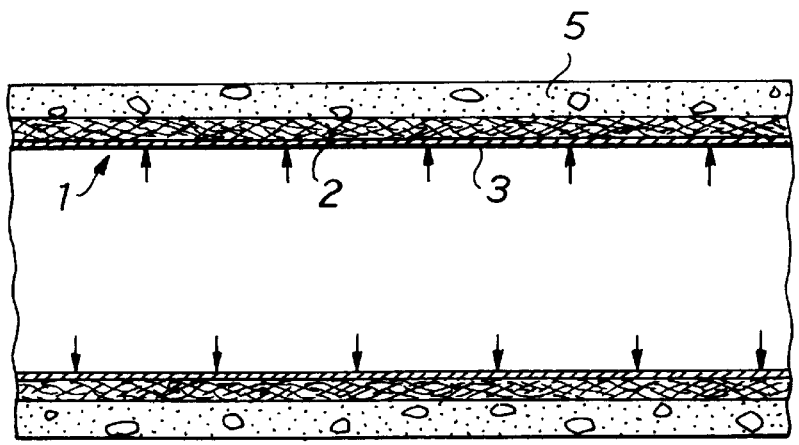
FIG. 3 shows a cross-sectional view of the pipe lining method which is implemented by use of the pipe liner bag according to the present invention.

In FIGS. 2 and 3, reference numeral 5 designates an aged pipeline, and the pipe liner bag 1 is everted into the pipeline 5 by a fluid pressure such as an air pressure. When the pipe liner bag 1 has been everted into the pipeline 5, the plastic film 3 coated over the outer surface of the tubular unwoven fabric 2 prior to the everting, is placed on the inner peripheral surface of the tubular unwoven fabric 2 to air-tight cover the inner surface of the pipe liner bag 1.

Then, finishing the everting of the pipe liner bag 1 into the pipeline 5 over the whole length thereof, the pipe liner bag 1 is pressed against the inner wall surface of the pipeline 5 by a fluid pressure, as shown in FIG. 3, and the pipe liner bag 1 is subjected to heating by any heating means such as hot water, hot air, steam, or the like, to cause hardening by heat of the thermosetting resin impregnated in the tubular unwoven fabric 2 of the pipe liner bag 1, and the inner wall surface of the pipeline 5 is lined with the hardened pipe liner bag 1 to repair the aged pipeline 5.

In the pipe liner bag 1 employed in the above described pipe lining operations, the plastic film 3 being coated on the less unthreadable side (the side needles are stuck out as the result of the needle punching processing) of the tubular unwoven fabric 2, the anti-peeling property thereof against the tubular unwoven fabric 2 is intensified to enable the plastic film 3 to evenly and firmly adhere to the tubular unwoven fabric 2.

Accordingly, the anti-peeling and anti-bursting properties of the plastic film 3 are intensified, so that plastic film 3 does never peel off the tubular unwoven fabric 2 even if the plastic film 3 is subjected to friction by a fluid like the drainage flowing in the pipeline 5 after being lined and the injection pressure of the high pressure water when cleaning the inside of the pipeline 5, and the plastic film 3 will never burst even if the plastic film 3 is subjected to a fluid pressure during the lining operations.

Figure 4:
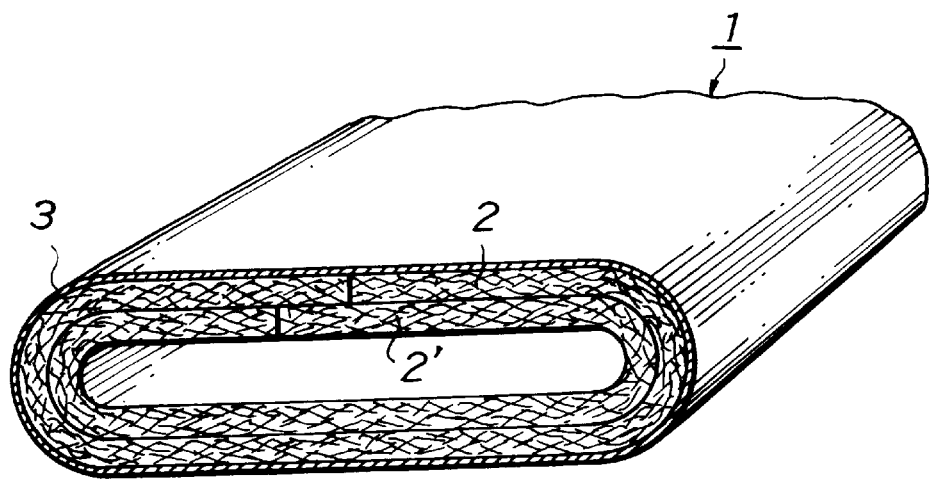
FIG. 4 shows a partial perspective view of the pipe liner bag having a two-layer structure according to the present invention.

By the way, as shown in FIG. 4, the pipe liner bag 1 may have a multi-layer structure formed by laminating the inner and outer layers of the tubular unwoven fabric 2, 2'. Also, in this case, the tubular unwoven fabric 2 forming the surface layer has the side having needles stuck out thereon by the needle punching processing (namely, less unthreadable side) as the outer surface. This outer surface is then covered with the highly air-tight plastic film 3 and each tubular unwoven fabric 2, 2' is impregnated with hardenable resin. Moreover, the pipe liner bag may be of a multi-layer structure having more than three layers formed by laminating a plurality of tubular unwoven fabric layers, and as the hardenable resin to be impregnated thereto, a photo-curing resin and the like may be employed in place of the thermosetting resin.

Figure 7:
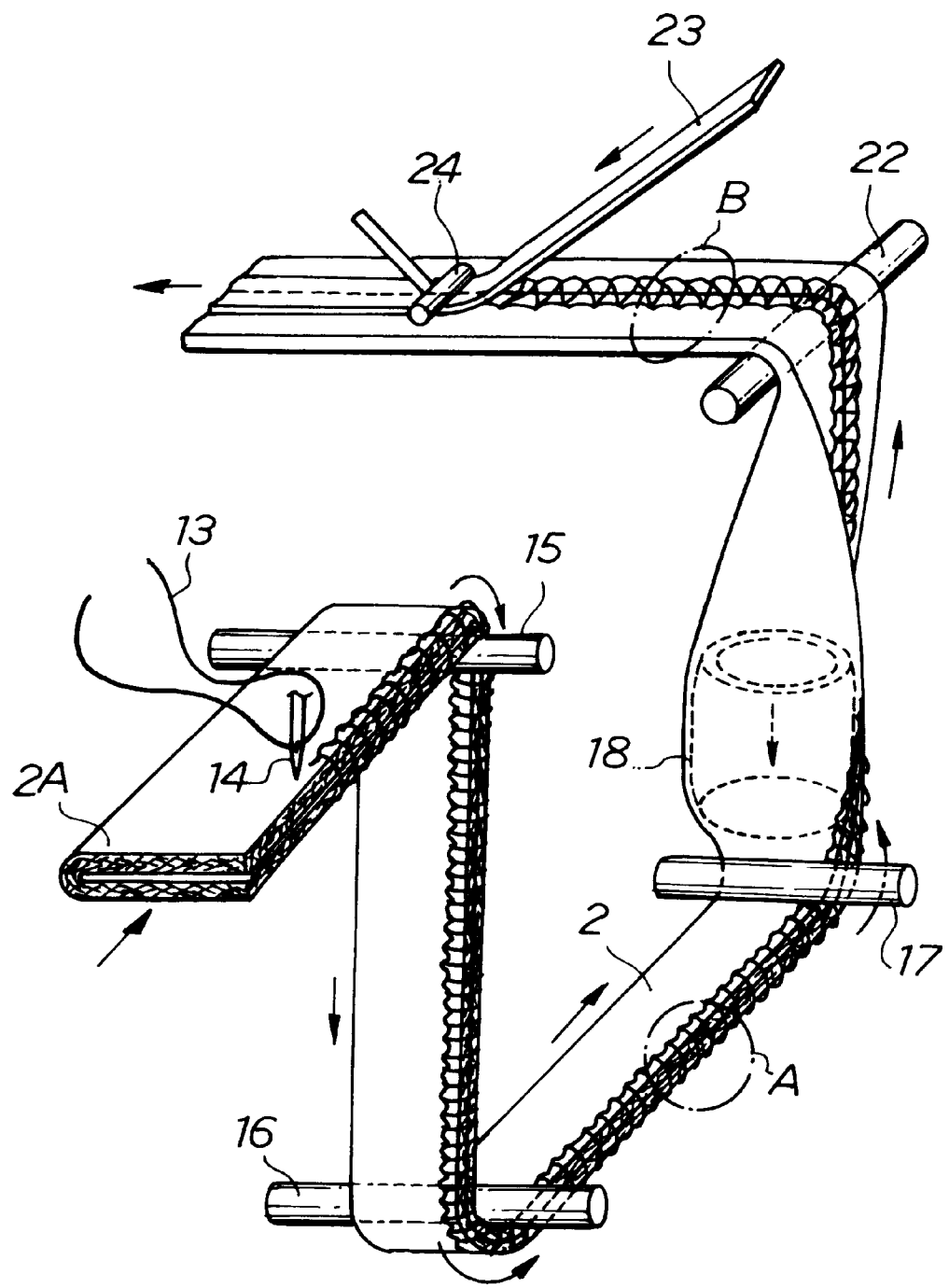
Figure 8:
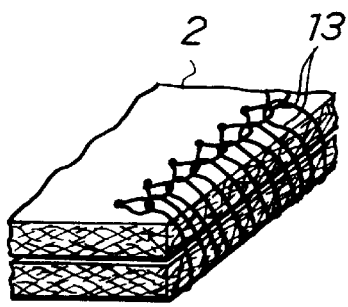
FIG. 8 is an enlarged view illustrating in detail a portion A of FIG. 7.
Figure 9:
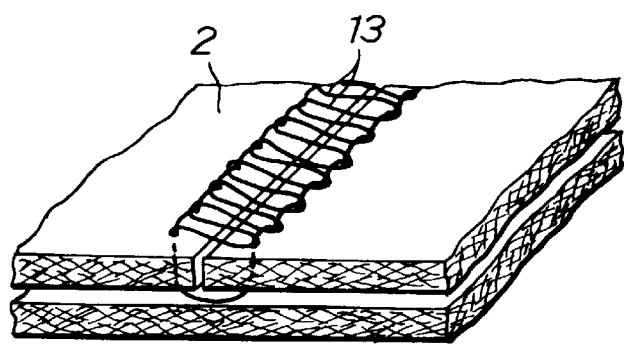
FIG. 9 is an enlarged view illustrating in detail a portion B of FIG. 7.

Next, a method of manufacturing the single layer pipe liner bag 1 as shown in FIG. 1 will be described below in conjunction with FIGS. 5 through 9. By the way, FIG. 5 is a diagram illustrating the needle punching processing of the unwoven fabric, FIGS. 6 and 7 are perspective views illustrating the method of manufacturing the pipe liner bag according to the present invention, FIG. 8 is an enlarged view illustrating in detail a portion A of FIG. 7, and FIG. 9 is an enlarged view illustrating in detail a portion B of FIG. 7.

Figure 5:
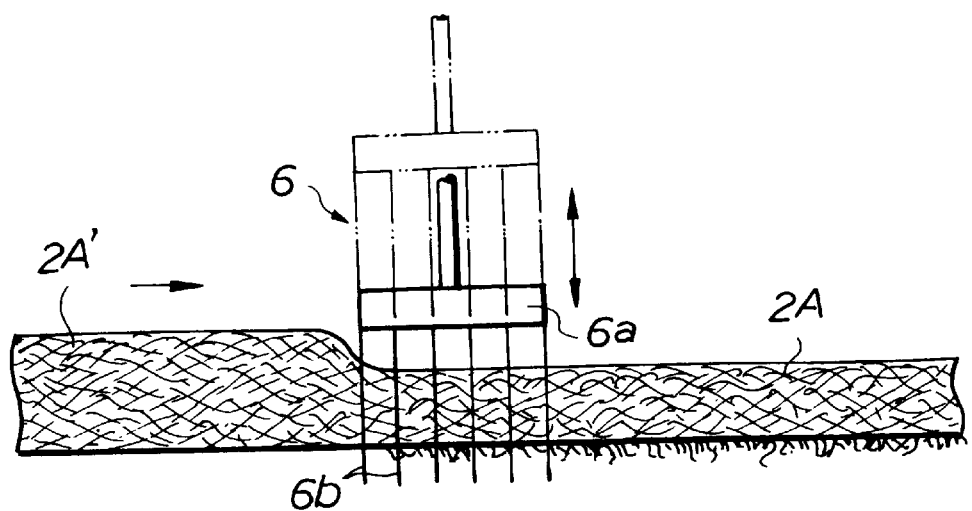
FIG. 5 shows needle punching processing of unwoven fabric.

The needle punching processing of the unwoven fabric forming the pipe liner bag 1 according to the present invention is shown in FIG. 5, wherein a material 2A' comprising irregularly laminating a multiplicity of yarns is subjected to the punching processing by a needle punching machine 6, while being transported at a predetermined speed to a direction indicated by a horizontal arrow (to the right), to obtain a unwoven fabric strip of a predetermined thickness. In other words, the needle punching machine 6 is equipped with a plurality of needles 6b which regularly move up and down with a head 6a, and these needles 6b stick in turn to the material 2A' from the upward direction to obtain the unwoven fabric strip 2A of a predetermined thickness.

By the way, in the unwoven fabric strip 2A processed in this way by the needle punching processing, the threads on the side the needles 6b are stuck out (lower side in FIG. 5) are by far less unthreadable than the threads on the side needles 6b are stuck in (upper side in FIG. 5), as described above.

Figure 6:
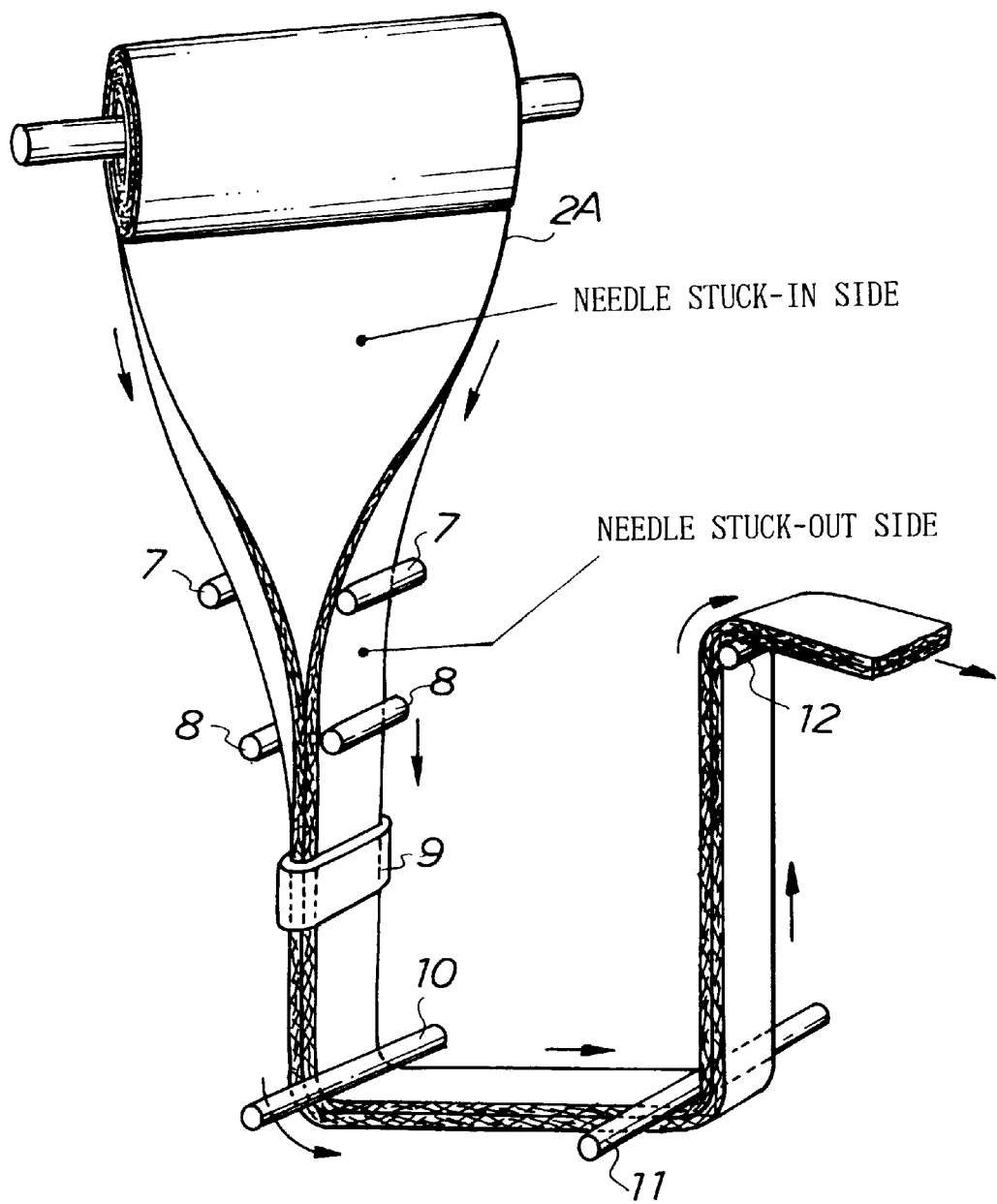
FIGS. 6 and 7 are perspective views illustrating how a method of manufacturing a pipe liner bag according to the present invention is implemented.

Then, the unwoven fabric strip 2A subjected to the needle punching processing as above described is, as shown in FIG. 6, wound in a roll keeping the side with stuck-out needles 6b (less unthreadable side) on the outside of the roll. The unwoven fabric 2A wound in a roll is sent out in order downward from the roll guided by two paired guide rollers 7, 8, then, by passing through an elongated ring-shaped frame 9, is sequentially folded into twofold such that the side with the stuck-out needles 6b comes out to be outside, and the edges of both ends in the width direction are aligned.

The unwoven fabric strip 2A folded in twofold by passing through the frame 9 is then bent at a right angle by a guide roller 10 to proceed substantially in the horizontal direction as illustrated in FIG. 6, again bent upwardly at a right angle by a guide roller 11, and further bent at a right angle by a guide roller 12 to direct substantially in the horizontal direction as illustrated in FIG. 6.

Then, the edges of both ends in width direction of the above-mentioned unwoven fabric strip 2A folded in twofold is, as shown in FIG. 7, stitched together by a thread 13 with the upper edge overlying the lower edge, in lock-sewing by a locking needle 14, while traveling substantially in the horizontal direction, to obtain the tubular unwoven fabric 2. An appearance of the stitched ends of the tubular unwoven fabric 2 is shown in FIG. 8.

The tubular unwoven fabric 2 obtained by the stitching as described above, is bent at a right angle by a guide roller 15, as shown in FIG. 7, to direct downwardly, bent at a right angle again by a guide roller 16 to travel substantially in the horizontal direction, and further bent at a right angle to the upward direction by a guide roller 17. The tubular unwoven fabric 2 is then, in the midway of upward traveling, gradually expanded portion by portion in the lengthwise direction by passing through an expanding die 18, and the edges in the stitching area are abutted against each other as shown in detail in FIG. 9.

Figure 10:
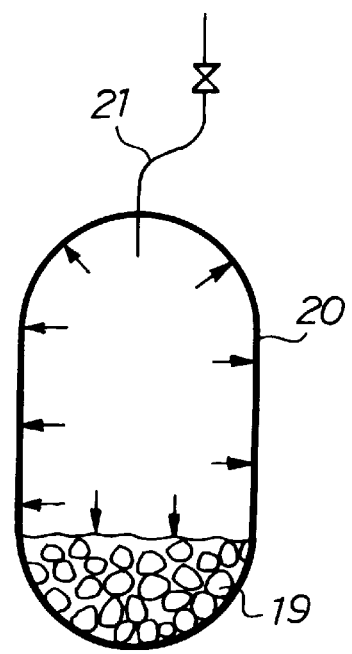
FIG. 10 shows a perspective view of a tubular air bag.

It should be noted that the above described expanding die 18 is made of a material having a high rigidity such as metal, plastic, wood, or the like, and may have a spherical shape instead of a pipe-like shape as employed in this embodiment. Alternatively, as shown in FIG. 10, an expanding die 18 may comprise a tubular air bag 20 loaded with weights 19 on the bottom thereof. In this case, the tubular air bag 20 is blown by a compressed air charged into the inside of the tubular air bag 20 from an air hose 21.

The tubular unwoven fabric 2 having the edges in the stitching area abutted against each other as above described is, folded to be flat, as shown in FIG. 7, after passing through the expanding die 18. At this point, the abutted area of the folded tubular unwoven fabric 2 is folded such that the abutted area is located substantially in the center in the width direction of the tubular unwoven fabric 2 as shown in FIG. 7. Then, the tubular unwoven fabric 2 thus folded is bent at a right angle by a guide roller 22 to be transported substantially in the horizontal direction as illustrated in FIG. 7, and against the outside of the abutted area (stitching area), a ribbon-shaped reinforcing material 23 is pressed by a pressing roller 24 to be adhered to by an adhesive or to be welded by heating. Moreover, the reinforcing material 23 comprises the unwoven fabric of the thickness of 3 mm or less having a side subjected to the needle punching processing and having stuck-out needles as the outer surface thereof, and the width measurement of the reinforcing material 23 is set larger than the width of the stitching area of the tubular unwoven fabric 2.

By the way, in this embodiment, a series of operations as shown in FIGS. 6 and 7 are carried out in sequence: namely, the unwoven fabric strip 2 wound in a roll is folded into twofold, the edges of both ends of the width direction are aligned and stitched together to obtain the tubular unwoven fabric 2, then the tubular unwoven fabric 2 is partially expanded in a pipe-shape portion by portion in the lengthwise direction by the expanding die 18 to have the edges in the stitching area abutted against each other, the tubular unwoven fabric 2 is then folded such that the abutted area is located substantially in the center in the width direction of the tubular unwoven fabric 2, and the outer surface of the abutted area is adhered to or welded by the a reinforcing material 23, all in sequence.

Furthermore, the tubular unwoven fabric 2 obtained through the series of operations described above has the side subjected to the needle punching processing and having the stuck-out needles 6b (the less unthreadable side) as the outer surface, as shown in FIG. 5, and the outer surface is coated with the plastic film 3 (refer to FIG. 1) by a known method. Then, the tubular unwoven fabric 2 having the outer surface coated with the plastic film 3 is impregnated with the thermosetting resin to obtain the pipe liner bag 1 according to the present invention as shown in FIG. 1.

Figure 11:
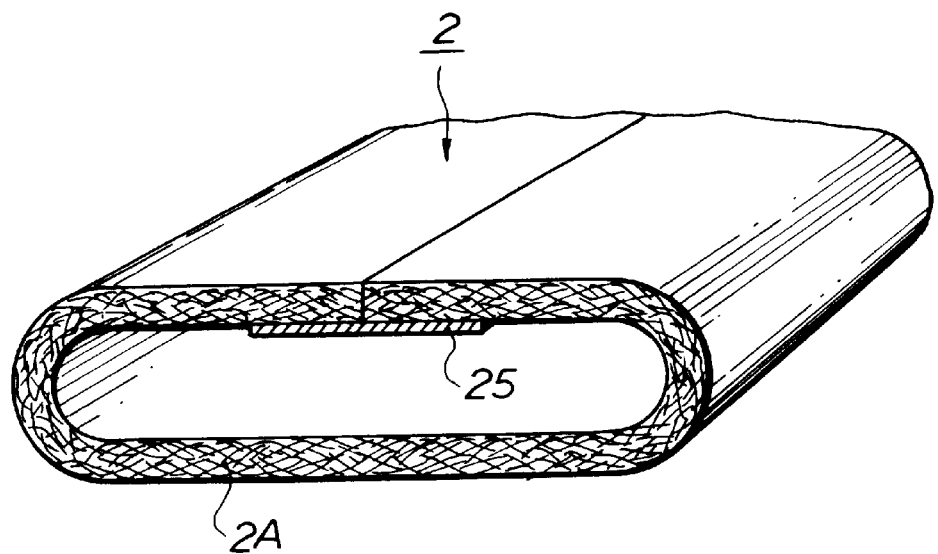
FIG. 11 shows a partial perspective view of a tubular unwoven fabric provisionally jointed by a reinforcing tape.
Figure 12:
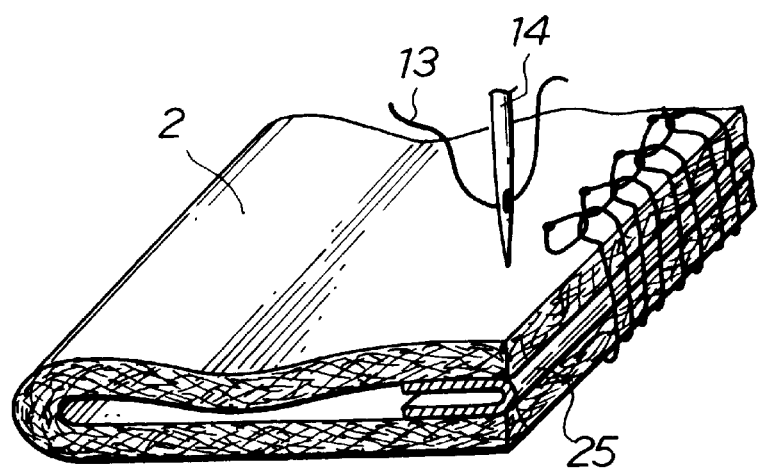
FIG. 12 is a partial perspective view for showing how to stitch the ends of the tubular unwoven fabric provisionally jointed by a reinforcing tape.
Figure 13:
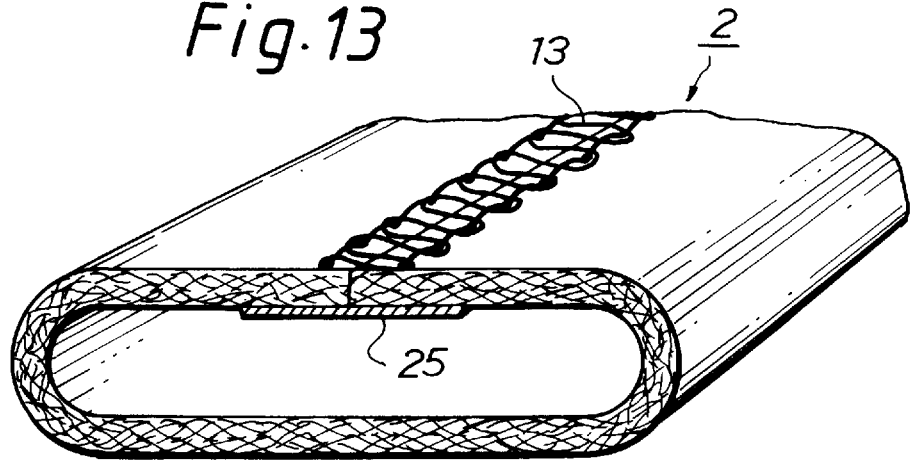
FIG. 13 shows a partial perspective view of the tubular unwoven fabric where a joining area is reinforced by a reinforcing tape.

Moreover, prior to obtaining the tubular unwoven fabric 2 by stitching, the tubular unwoven fabric 2 is arranged to be obtained once by rounding the unwoven fabric 2A as shown in FIG. 11 to have the edges of the ends in width direction abutted against each other, and by provisionally joining the abutted area with a reinforcing tape 25 made of unwoven fabric adhered to or welded with the inner surface of the abutted area. Then, as shown in FIG. 12, if the tubular unwoven fabric 2 is folded with the abutted area of the tubular unwoven fabric 2 used as a boundary, the reinforcing tape 25 remains between the upper and lower ends of the tubular unwoven fabric 2. However, the tubular unwoven fabric 2 with the inner surface of the abutted area reinforced by the reinforcing tape 25 is obtained if the edges of the aligned upper and lower ends of the tubular unwoven fabric 2 are stitched together with the reinforcing tape 25 and the thread 13 by the locking needle 14, and then the tubular unwoven fabric 2 is expanded in a pipe shape, as shown in FIG. 13.

Figure 14:
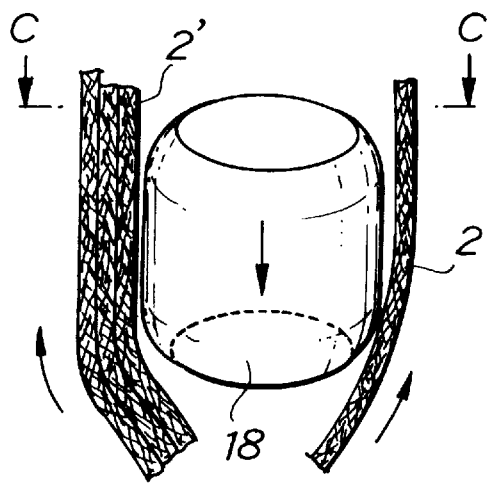
FIG. 14 is a partial lateral cross-sectional view illustrating how to extend the tubular unwoven fabric of the pipe liner bag having two-layer structure by use of a expanding die.
Figure 15:
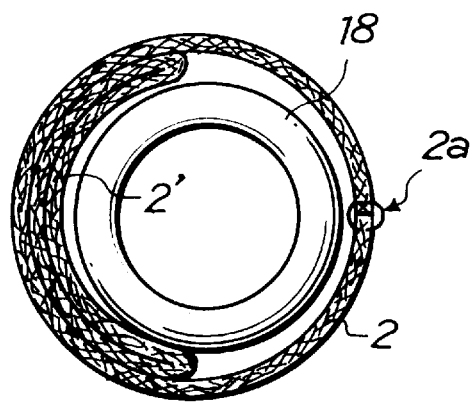
FIG. 15 shows a cross-sectional view of FIG. 14 taken along a C—C line.

Also, the pipes liner bag 1' having a two-layer structure as shown in FIG. 4 may be manufactured by a method according to the present invention, but in order to expand the tubular unwoven fabric 2 in a pipe shape to have the tubular unwoven fabric 2 of the surface layer abutted against each other, the tubular unwoven fabric 2 of the inner layer is folded flat as shown in FIGS. 14 and 15, the folded tubular unwoven fabric 2' is then put aside to one side within the tubular unwoven fabric 2 of the surface layer (the opposite side of the stitching area 2a of the tubular unwoven fabric 2) and tacked temporarily to a suitable location of the tubular unwoven fabric 2 to arrange both of the tubular unwoven fabrics 2, 2' to pass through the expanding die 18. By this way, the tubular unwoven fabric 2 of the surface layer is expanded in a pipe shape as shown in FIG. 15, and the two edges of the stitching area 2a is abutted against each other in a manner similar to that shown in FIG. 9. Subsequently, the operations proceed in similar way as above described, and the reinforcing material 23 (refer to FIG. 7) is adhered to or welded with the outer surface of the abutted area of the tubular unwoven fabric 2, then the plastic film 3 is coated over the outer surface of the tubular unwoven fabric 2, and the hardenable resin is impregnated into both of the tubular unwoven fabrics 2, 2' to obtain the pipe liner bag 1' having a two-layer structure as shown in FIG. 4. By the way, FIG. 14 is a partial lateral cross-sectional view illustrating an appearance of the tubular unwoven fabric expanded by use of an expanding die, and FIG. 15 is the cross-sectional view taken along a C—C line in FIG. 14.

Figure 16:
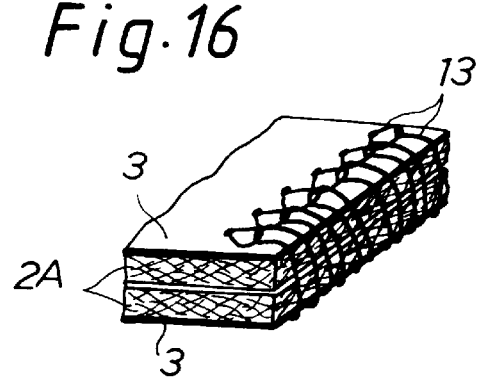
FIG. 16 shows a partial perspective view of a stitching area of a unwoven fabric strip for illustrating another method of manufacturing a pipe liner bag according to the present invention.
Figure 17:
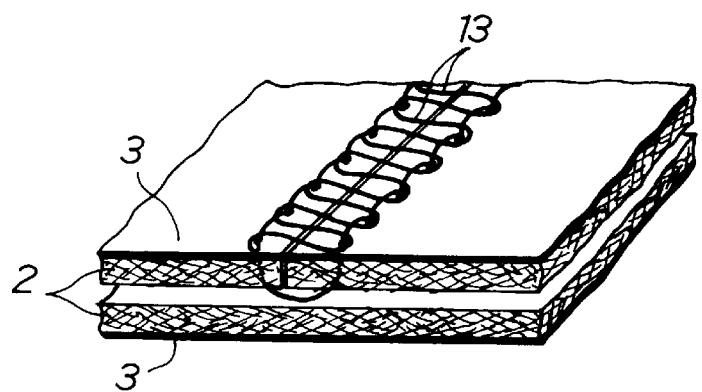
FIG. 17 shows a partial perspective view of an abutted area of tubular unwoven fabric for illustrating still another method of manufacturing a pipe liner bag according to the present invention.
Figure 18:
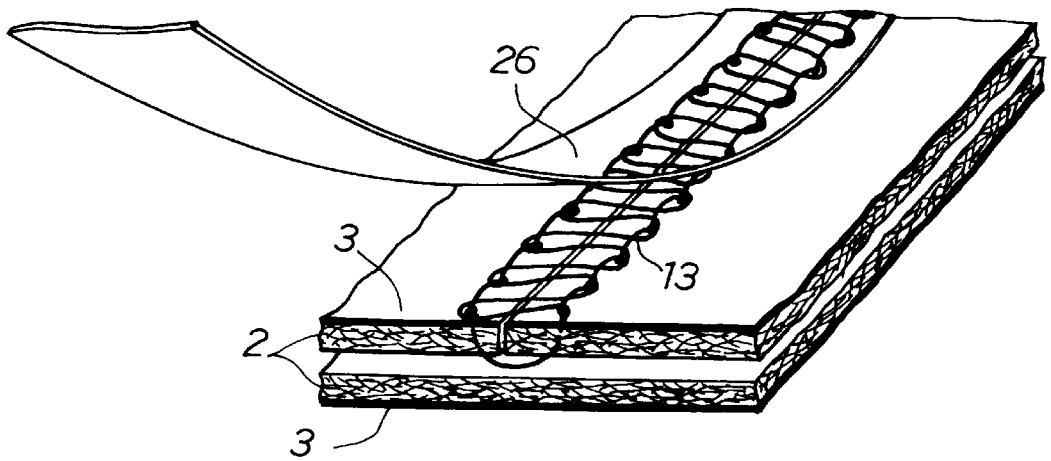
FIG. 18 shows a partial perspective view illustrating how an abutted area of the tubular unwoven fabric is adhered to or welded with a sealing tape, for illustrating a further method of manufacturing a pipe liner bag according to the present invention.

By the way, although, in the manufacturing method of the tubular liner bag 1 as described above, the plastic film 3 is coated over the outer surfaces of the tubular unwoven fabric 2 after the abutted area of the tubular unwoven fabric 2 is adhered to or welded with the reinforcing material 23, the plastic film 3 may be coated beforehand over the outer surface of the side of the unwoven fabric strip 2A subjected to the needle punching processing and having stuck-out needles 6b. In this case, as shown in FIG. 16, the unwoven fabric strip 2A coated over the outer surface thereof with the plastic film 3 is folded in twofold with the outer surface thereof exposed to the outside, and both ends of the unwoven fabric strip 2A are aligned and stitched by the thread 13, to obtain the tubular unwoven fabric 2. Then, the tubular unwoven fabric 2 is gradually expanded in a pipe shape, portion by portion in lengthwise direction, to have the edges of the stitching area abutted against each other as shown in FIG. 17. Then, as shown in FIG. 18, the tubular unwoven fabric 2 is folded such that the abutted area thereof is located substantially in the center of the width direction of the tubular unwoven fabric 2, the abutted area (stitching area) is adhered to or welded with the outer surface by a sealing tape 26, and then the tubular unwoven fabric 2 is impregnated with the hardenable resin, thus completing the pipe liner bag similar to the pipe liner bag 1 as shown in FIG. 1.

As will be apparent from the above description, according to the present invention, since the tubular unwoven fabric is arranged to have the side with stuck-out needles (i.e., the side on which threads are less unthreadable) as the outer surface thereof to be coated with the plastic film, the anti-peeling strength of the plastic film against the unwoven fabric is enhanced, thereby making it possible to provide a pipe liner bag with the plastic film having improved anti-peeling and anti-bursting properties.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A method of manufacturing a pipe liner bag comprising the steps of:

performing needle punching processing on a unwoven fabric strip;

folding said unwoven fabric strip in twofold such that a side having the stuck-out needles is exposed to the outside to serve as an outer surface;

aligning both edges and stitching said edges together to obtain a tubular unwoven fabric gradually expanding said tubular unwoven fabric in a pipe shape, portion by portion in lengthwise direction, with the edges in the stitching area being abutted against each other, folding the tubular unwoven fabric such that the abutted area is located substantially in the center of the width direction of the tubular unwoven fabric, adhering or welding the outer surface of said abutted area to or with a reinforcing material, said reinforcing material being formed of an unwoven fabric strip having the outer surface subjected to the needle punching processing to have stuck-out needles protruding therefrom;

coating the outer surface of the tubular unwoven fabric with a highly air-tight plastic film; and impregnating the tubular unwoven fabric with a hardenable resin.

2. A method of manufacturing a pipe liner bag according to claim 1, wherein said reinforcing material comprises an unwoven fabric having a thickness of 3 m/m or less, said thickness being larger than the width of the stitching area of said tubular unwoven fabric.

3. A method of manufacturing a pipe liner bag according to claim 2, wherein the inner surface of the abutted area of said tubular unwoven fabric is adhered to or welded with the reinforcing tape formed of the unwoven material, so that the abutted area is provisionally jointed.

4. A method of manufacturing a pipe liner bag according to claim 2, wherein a series of said processing steps except for at least said step of impregnating the hardenable resin into said tubular resin absorbent material is sequentially performed.

5. A method of manufacturing a pipe liner bag according to claim 2, wherein said tubular unwoven fabric comprises a multi-layer structure, said multi-layer structure being composed of a plurality of laminated unwoven fabric layers.

6. A method of manufacturing a pipe liner bag according to claim 2 wherein said step of gradually expanding said tubular unwoven fabric in a pipe shape, portion by portion in lengthwise direction, comprises the step of passing said tubular unwoven fabric through an expanding die disposed inside of said tubular unwoven fabric.

7. A method of manufacturing a pipe liner bag according to claim 1, wherein the inner surface of the abutted area of said tubular unwoven fabric is adhered to or welded with the reinforcing tape formed of the unwoven material, so that the abutted area is provisionally jointed.

8. A method of manufacturing a pipe liner bag according to claim 7, wherein a series of said processing steps except for at least said step of impregnating the hardenable resin into said tubular resin absorbent material is sequentially performed.

9. A method of manufacturing a pipe liner bag according to claim 7, wherein said tubular unwoven fabric comprises a multi-layer structure, said multi-layer structure being composed of a plurality of laminated unwoven fabric layers.

10. A method of manufacturing a pipe liner bag according to claim 7, wherein said step of gradually expanding said tubular unwoven fabric in a pipe shape, portion by portion in lengthwise direction, comprises the step of passing said tubular unwoven fabric through an expanding die disposed inside of said tubular unwoven fabric.

11. A method of manufacturing a pipe liner bag according to claim 1, wherein a series of said processing steps except for at least said step of impregnating the hardenable resin into said tubular resin absorbent material is sequentially performed.

12. A method of manufacturing a pipe liner bag according to claim 11, wherein said tubular unwoven fabric comprises a multi-layer structure, said multi-layer structure being composed of a plurality of laminated unwoven fabric layers.

13. A method of manufacturing a pipe liner bag according to claim 11, wherein said step of gradually expanding said tubular unwoven fabric in a pipe shape, portion by portion in lengthwise direction, comprises the step of passing said tubular unwoven fabric through an expanding die disposed inside of said tubular unwoven fabric.

14. A method of manufacturing a pipe liner bag according to claim 1, wherein said tubular unwoven fabric comprises a multi-layer structure, said multi-layer structure being composed of a plurality of laminated unwoven fabric layers.

15. A method of manufacturing a pipe liner bag according to claim 14, wherein said step of gradually expanding said tubular unwoven fabric in a pipe shape, portion by portion in lengthwise direction, comprises the step of passing said tubular unwoven fabric through an expanding die disposed inside of said tubular unwoven fabric.

16. A method of manufacturing a pipe liner bag according to claim 1, wherein said step of gradually expanding said tubular unwoven fabric in a pipe shape, portion by portion in lengthwise direction, comprises the step of passing said tubular unwoven fabric through an expanding die disposed inside of said tubular unwoven fabric.

17. A method of manufacturing a pipe liner bag according to claim 16, wherein said expanding die comprises a pipe or a sphere made of metal, plastic, or wood.

18. A method of manufacturing a pipe liner bag according to claim 16, wherein said expanding die comprises a tubular air bag and weights loaded in said tubular air bag.

19. A method of manufacturing a pipe liner bag comprising the steps of:

performing needle punching processing on a surface of an unwoven fabric strip to have stuck-out needles protruding therefrom;

coating the surface of said unwoven fabric strip with a highly air-tight plastic film;

folding said unwoven fabric strip in twofold such that the side coated with the plastic film is exposed to the outside to serve as an outer surface;

aligning both edges of said unwoven fabric and stitching said edges together to obtain a tubular unwoven fabric gradually expanding said tubular unwoven fabric in a pipe shape, portion by portion in lengthwise direction, with the edges in the stitching area being abutted against each other;

folding said tubular unwoven fabric such that the abutted area is located substantially in the center of the width direction thereof;

adhering said abutted area to or welding said abutted area with a sealing tape on the outer surface thereof; and impregnating the tubular unwoven fabric with a hardenable resin.

20. A method of manufacturing a pipe liner bag according to claim 19, wherein the inner surface of the abutted area of said tubular unwoven fabric is adhered to or welded with the reinforcing tape formed of the unwoven material, so that the abutted area is provisionally jointed.

21. A method of manufacturing a pipe liner bag according to claim 19, wherein a series of said processing steps except for at least said step of impregnating the hardenable resin into said tubular resin absorbent material is sequentially performed.

22. A method of manufacturing a pipe liner bag according to claim 19, wherein said tubular unwoven fabric comprises a multi-layer structure, said multi-layer structure being composed of a plurality of laminated unwoven fabric layers.

23. As method of manufacturing a pipe liner bag according to claim 19, wherein said step of gradually expanding said tubular unwoven fabric in a pipe shape, portion by portion in lengthwise direction, comprises the step of passing said tubular unwoven fabric through an expanding die disposed inside of said tubular unwoven fabric.

* * * * *